July 12, 1927.
E. L. GIBSON
1,635,473
FOOT REST FOR AUTOMOBILE ACCELERATORS
Filed Nov. 17, 1926
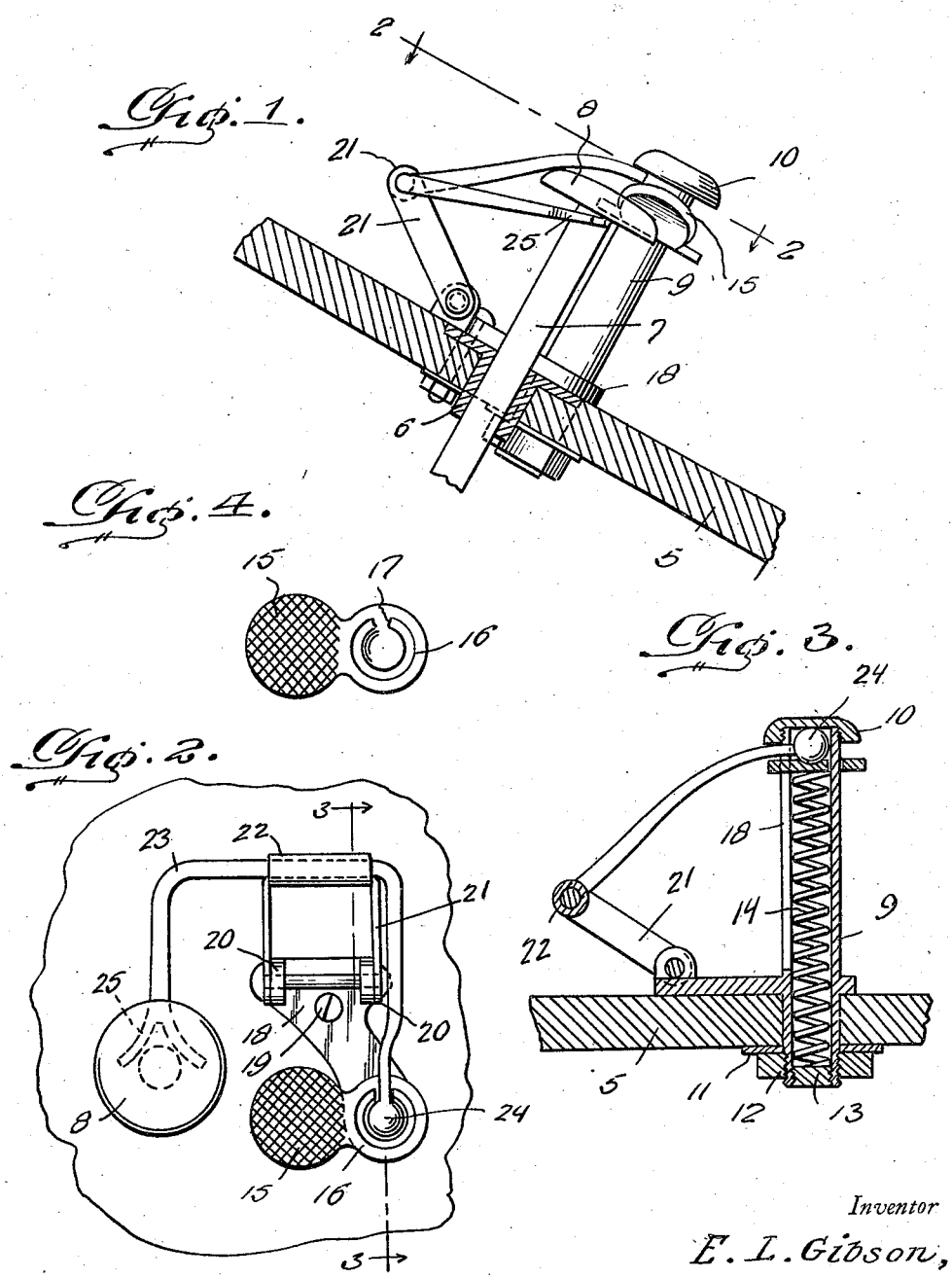
Inventor
*E. L. Gibson,*
By *Clarence A. O'Brien*
Attorney Patented July 12, 1927.

1,635,473

UNITED STATES PATENT OFFICE.

ERNEST L. GIBSON, OF DORA, TEXAS.

FOOT REST FOR AUTOMOBILE ACCELERATORS.

Application filed November 17, 1926. Serial No. 148,907.

This invention relates to a new and useful improvement in foot rests for automobile accelerators, and has for its primary object to provide a foot rest that will automatically follow the downward and upward movement of the accelerator pedal so that the foot may be maintained in even position upon the accelerator pedal and to permit the pedal to be moved downwardly to the fullest extent.

In foot rests now generally in use, it is necessary that the foot be tilted at an angle when actuating the accelerator pedal which is very tiresome and frequently results in the operator's foot slipping from the accelerator, and in practically every instance prevents the full depression of the pedal as long as the foot is disposed upon the rest.

A further and most important object of the invention resides in the provision of a foot rest wherein the rest member per se may be locked against sliding movement in either direction while the foot is in contact with the accelerator pedal so as to prevent the accidental movement of the accelerator pedal when the car passes over bumps or uneven surfaces in the roadway, that results in the rapid increase or decrease of the speed of the engine, which is very detrimental to the parts of the automobile, and especially the differential mechanism thereof.

The invention further aims to provide a foot rest for accelerator pedals that may be employed in association with practically all types of accelerator pedals and that may be readily installed in the automobile, and this without requiring great expense.

Other objects will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout the several views:

Figure 1 is a section taken through the foot board of an automobile disclosing the accelerator pedal in side elevation and in association with which is my improved foot rest.

Figure 2 is a longitudinal section taken substantially upon the line 2—2 of Figure 1 for disclosing the major elements of the foot rest and the accelerator pedal in top plan.

Figure 3 is a section taken substantially upon the line 3—3 of Figure 2, and

Figure 4 is a top plan view of the foot supporting button per se that constitutes an essential feature of the present invention.

Now having particular reference to the drawing, 5 designates the foot board of an automobile within an opening through which is disposed the usual anti-friction bearing 6 for the accelerator pedal shank 7 upon the upper end of which is a foot supporting head 8. My invention consists of a hollow tubular post 9 threaded externally at its lower end and for disposition at this end through an opening in the floor board 5 slightly forwardly of and at the side of the accelerator pedal, as indicated in Figures 1 and 2. The length of this tubular post is such that the upper end thereof extends slightly above the foot pedal end of the accelerator pedal as indicated in Figure 2. The upper end of this post is open and externally threaded for receiving a cap 10. After the post has been disposed through the opening in the floor board, a washer and nut 11 and 12, respectively are disposed thereover for securely retaining the post within said opening.

The lower end of the post 9 is provided with a plug 13, while disposed within the post is an expansible coil spring 14, as shown in Figure 3. The invention further includes a small and preferably circular foot supporting button 15, the top surface of which is milled to prevent the foot from slipping, while at the edge of this button is formed a laterally extending disc 16 that is formed centrally with a C-shaped slot 17, the ends of which are in slight spaced relation so as to maintain the center of the disc connected to the body thereof, as shown in Figure 4.

The rear side of the post 9 is formed with a vertical slot 18 that extends substantially from the floor board 5 to the upper end of the post, and within which will be slidably arranged the connecting portion between the center and perimeter of the disc 16 formed upon the foot button 15, it being obvious that the tubular post 9 will engage through the C-shaped slot 17 of said disc when the same is arranged thereon as clearly indicated in Figure 3. Furthermore, this type of connection between the foot supporting button and the post will prevent the rotation of the button upon the post.

Directly above the floor board 5, the tubular post 9 is formed with a rearwardly extending and inwardly converging plate 18 that has flush engagement with the floor board and is preferably secured thereto by a bolt and nut connection 19. The end of this plate 18 is formed at its opposite edges with vertical ears 20—20 to which are pivotally secured the free ends of the arms of a U-shaped link 21, the horizontal bight portion of which is formed with a sleeve 22.

Loosely mounted within the sleeve 22 of the link 21 is the elongated and horizontal bight portion of a relatively U-shaped lever 23, the arms of which extend inwardly toward the accelerator pedal and said tubular post as shown in Figures 1, 2 and 3.

The arm of the lever adjacent the post 9 is bent upwardly and extends at its end through the slot 18 in said post above the disc 16 at which end the same is provided with a head 24 for engagement upon the center of said disc as indicated in Figure 3.

The other arm of the lever 23 extends beneath the foot button of the accelerator pedal and is bifurcated at said end as at 25 for engagement over opposite sides of the shank of the pedal as indicated by the dotted lines in Figure 2.

Obviously when the foot is positioned upon the button 15 of the foot rest and the accelerator pedal which are in substantial transverse alignment, the accelerator pedal may be moved downwardly as desired.

However, by slightly tilting the foot so as to cant the plate 16 of the foot rest button 15 upon the post 9, said foot rest will be locked to the post and by reason of the accelerator pedal being beneath the foot the same cannot be accidentally forced downwardly or permitted to rise which is the usual result when the vehicle passes over bumps or uneven road surfaces. When it is desired to move the accelerator still further downwardly, it is only necessary to move the foot back to normal position so that pressure may be applied to the accelerator, whereas on the other hand when it is desired to slowly or rapidly permit the accelerator to return to normal position, the foot is raised, and the accelerator will return by reason of the usual spring, not shown, to its normal position, while the foot supporting button per se will be raised by reason of the coil spring 14 within the tubular post 9.

By reason of the link connection 21 between the lever 23 and post carrying plate 18, the proper engagement of the inner ends of the arms of said lever with respect to the foot rest post 9, and accelerator pedal will be maintained.

It will thus be seen that I have provided a highly novel, simple, and efficient form of foot rest for automobile accelerators that is well adapted for all the purposes heretofore designated, even though I have herein shown and described the invention as consisting of certain detail structural elements it is nevertheless to be understood that some changes may be made therein without affecting the spirit and scope of the appended claims.

Having thus described the invention, what I claim as new is:

1. In a foot rest for automobile accelerators, a post secured to the automobile foot board at the side of the accelerator pedal, a foot button disposed for vertical sliding movement upon the post and operable for binding engagement with the post when foot pressure is applied thereto, means operable by the downward movement of the accelerator pedal for forcing said foot resting pedal downwardly upon the post, and means for automatically raising the button when pressure thereon is released.

2. In a foot rest for automobile accelerators, a vertical supporting member secured to the foot board of the automobile adjacent the accelerator pedal, a foot supporting button disposed for vertical sliding movement upon the supporting member when the same is in substantially horizontal position and operable for clutched engagement with the member at any point thereon when the button is tilted so that the accelerator pedal will be maintained in rigid depressed position beneath the foot at the side of the resting button, and automatic means for raising the button simultaneously with the raising of the pedal when the foot pressure is released.

3. In a foot rest for automobile accelerators, a post secured to the automobile foot board at the side of the accelerator pedal, a foot supporting button disposed for vertical sliding movement upon the post and operable for binding engagement with the post when foot pressure is applied thereto, means operable by the downward movement of the accelerator pedal for forcing said foot resting pedal downwardly upon the post, means for automatically raising the button when pressure thereon is released, said first mentioned means consisting of a pivotal relatively U-shaped lever, the end of one arm of which is arranged beneath the button of the accelerator lever pedal and the end of the other arm disposed in position above the post engaging portion of said foot supporting button.

4. In a foot rest for automobile accelerators, a post secured to the automobile foot board at the side of the accelerator pedal, a foot supporting button disposed for vertical sliding movement upon the post and operable for binding engagement with the post when foot pressure is applied thereto, means operable by the downward movement of the accelerator pedal for forcing said foot resting pedal downwardly upon the post, and means for automatically raising the button when pressure thereon is released, said first mentioned means consisting of a pivotal relatively U-shaped lever, the end of one arm of which is arranged beneath the button of the accelerator lever pedal and the end of the other arm disposed in position above the post engaging portion of said foot supporting button, said last mentioned means consisting of an expansible spring so associated with the post as to normally apply pressure upon the foot supporting button in an upward direction.

5. In a foot rest for automobile accelerators, a vertical supporting member secured to the foot board of the automobile adjacent the accelerator pedal, a foot supporting button disposed for vertical sliding movement on the supporting member so as to follow the reverse movement of the accelerator pedal under the action of the operator's foot, and means for interconnecting said foot supporting button and the accelerator pedal.

6. In a foot rest for automobile accelerators, a vertical supporting member secured to the floor board of the automobile adjacent the accelerator pedal, a foot supporting button disposed for vertical slidable movement on the supporting member so as to follow the reverse movement of the accelerator pedal under the action of the operator's foot, and a connection between the foot accelerator pedal and said foot supporting button whereby the button may be rigidly secured to the supporting member at any predetermined position thereon.

7. In a foot rest for automobile accelerators, a vertical supporting member secured to the foot board of the automobile adjacent the accelerator pedal, a foot supporting button disposed for vertical sliding movement on the supporting member so as to follow the reverse movement of the accelerator pedal under the action of the operator's foot, said foot supporting button adapted for tiltable movement for rigidly securing the same on the supporting member at any predetermined position, and an operative connection between said button and the accelerator pedal.

In testimony whereof I affix my signature.

ERNEST L. GIBSON.